United States Patent
Duffy et al.

(10) Patent No.: US 9,866,801 B2
(45) Date of Patent: Jan. 9, 2018

(54) HOME VIDEO CAPTURING AND MONITORING SYSTEM

(71) Applicant: GOOGLE INC., Mountain View, CA (US)

(72) Inventors: Gregory R. Duffy, San Francisco, CA (US); Melissa D. McLean, Novato, CA (US); Aamir S. Virani, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/084,407

(22) Filed: Mar. 29, 2016

(65) Prior Publication Data

US 2016/0212386 A1 Jul. 21, 2016

Related U.S. Application Data

(63) Continuation of application No. 14/701,283, filed on Apr. 30, 2015, which is a continuation of application
(Continued)

(51) Int. Cl.
*H04N 5/228* (2006.01)
*H04N 7/14* (2006.01)
(Continued)

(52) U.S. Cl.
CPC .......... *H04N 7/183* (2013.01); *G08B 13/1963* (2013.01); *G08B 13/19619* (2013.01);
(Continued)

(58) Field of Classification Search
CPC .......... H04N 7/18; H04N 7/181; H04N 7/183; H04N 7/185; H04N 7/186; H04N 7/188;
(Continued)

(56) References Cited

U.S. PATENT DOCUMENTS 2,997,935 A 8/1961 Scheffold
3,782,260 A 1/1974 Ettischer et al.
(Continued)

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.
(Continued)

*Primary Examiner* — Chia-Wei A Chen
(74) *Attorney, Agent, or Firm* — Morgan, Lewis & Bockius LLP

(57) ABSTRACT

This application discloses a home video capturing and monitoring system including a video camera, an executable application, and a remote server. The video camera further includes a camera configured to capture video data, a wireless antenna, a wireless transceiver coupled to the wireless antenna and configured to wirelessly communicate video data captured by the camera to a mobile phone, and one or more infrared light emitting diodes configured to illuminate a field of view with infrared light upon a determination that ambient light is low. The application is executed by the mobile phone, and configured to receive the video data captured by the camera and display the captured video data for review by a user of the mobile phone. The remote server is configured to receive, store and analyze the video data communicated from the video camera, and alert the user based on the analysis of the received video data.

20 Claims, 14 Drawing Sheets

Related U.S. Application Data

No. 13/604,399, filed on Sep. 5, 2012, now Pat. No. 9,071,740.

(60) Provisional application No. 61/552,821, filed on Oct. 28, 2011.

(51) Int. Cl.

| | | |
|---|---|---|
| *H04N 7/18* | (2006.01) | |
| *H04N 5/225* | (2006.01) | |
| *H04N 5/232* | (2006.01) | |
| *H04N 5/33* | (2006.01) | |
| *H04N 5/77* | (2006.01) | |
| *G08B 13/196* | (2006.01) | |

(52) U.S. Cl.
CPC . *G08B 13/19656* (2013.01); *G08B 13/19658* (2013.01); *H04N 5/2252* (2013.01); *H04N 5/23241* (2013.01); *H04N 5/33* (2013.01); *H04N 5/77* (2013.01)

(58) Field of Classification Search
CPC ....... H04N 21/23418; H04N 21/44008; H04N 7/15; H04N 21/2187; H04N 21/41407; H04N 7/141; H04N 7/147; G06K 9/00335; G06K 9/00342; G06K 9/00771; G06K 9/00778; G06T 2207/30232; G06T 7/20; G08B 13/196; G08B 13/19602; G08B 13/19604; G08B 13/19608; G08B 13/1961; G08B 13/19613; G08B 13/19615; G08B 13/19617; G08B 13/19619; G08B 13/19621; G08B 13/19623; G08B 13/19645; G08B 13/19652; G08B 13/19654; G08B 13/19656; G08B 13/19658; G08B 13/1966; G08B 13/19663; G08B 13/19665; G08B 13/19667; G08B 13/19669; G08B 13/19671; G08B 13/19673; G08B 13/19676; G08B 13/19678; G08B 13/1968; G08B 13/19682; G08B 13/19686; G08B 13/19689; G08B 13/19691; G08B 13/19693; G08B 13/19695; G08B 13/19697; H04L 65/403; H04L 67/04; H04L 12/1822; H04L 67/1095
USPC .......................................... 348/143–159, 373
See application file for complete search history.

(56) References Cited

U.S. PATENT DOCUMENTS

| | | |
|---|---|---|
| D349,914 S | 8/1994 | Usui |
| D357,267 S | 4/1995 | Yotsuya |
| D372,490 S | 8/1996 | Sheffield et al. |
| 5,604,534 A | 2/1997 | Hedges |
| D385,571 S | 10/1997 | Abrams |
| 5,862,428 A | 1/1999 | An |
| 5,963,253 A | 10/1999 | Dwyer |
| 5,978,028 A * | 11/1999 | Yamane ................. H04N 1/195 248/558 |
| 6,088,470 A | 7/2000 | Camus |
| D429,269 S | 8/2000 | Renkis |
| D429,743 S | 8/2000 | Renkis |
| 6,141,052 A | 10/2000 | Fukumitsu et al. |
| 6,147,701 A | 11/2000 | Tamura et al. |
| D442,202 S | 5/2001 | Pfeifer et al. |
| D445,123 S | 7/2001 | Shen |
| 6,268,882 B1 | 7/2001 | Elberbaum |
| D446,534 S | 8/2001 | Zimmer |
| D447,758 S | 9/2001 | Lin et al. |
| D449,630 S | 10/2001 | Rak et al. |
| D452,259 S | 12/2001 | Choi |
| 6,357,936 B1 | 3/2002 | Elberbaum |
| D455,164 S | 4/2002 | Tsang et al. |
| 6,462,781 B1 | 10/2002 | Arnold |
| D467,952 S | 12/2002 | Nakamura |
| D469,775 S | 2/2003 | Bradley |
| D470,874 S | 2/2003 | Chiu |
| D470,875 S | 2/2003 | Liao |
| 6,515,275 B1 | 2/2003 | Hunter et al. |
| 6,634,804 B1 | 10/2003 | Toste et al. |
| 6,650,694 B1 | 11/2003 | Brown et al. |
| 6,678,001 B1 | 1/2004 | Elberbaum |
| 6,714,236 B1 | 3/2004 | Wada et al. |
| 6,714,286 B1 | 3/2004 | Wheel |
| 6,727,954 B1 | 4/2004 | Okada et al. |
| D489,388 S | 5/2004 | Saito et al. |
| 6,762,790 B1 | 7/2004 | Matko et al. |
| D511,352 S | 11/2005 | Oliver et al. |
| 7,034,884 B2 | 4/2006 | Misawa |
| 7,066,664 B1 | 6/2006 | Sitoh et al. |
| 7,076,162 B2 | 7/2006 | Yamashita |
| D527,755 S | 9/2006 | Wu |
| 7,151,565 B1 | 12/2006 | Wada et al. |
| D534,938 S | 1/2007 | Beasley et al. |
| D537,097 S | 2/2007 | Freeman |
| D542,320 S | 5/2007 | Cheng |
| D552,649 S | 10/2007 | Logan et al. |
| D552,659 S | 10/2007 | Stephens et al. |
| D555,692 S | 11/2007 | Liu et al. |
| 7,290,740 B2 | 11/2007 | Joy et al. |
| D558,250 S | 12/2007 | Hsia |
| D563,446 S | 3/2008 | Stephens et al. |
| D575,316 S | 8/2008 | Liu et al. |
| 7,443,446 B2 | 10/2008 | Seo |
| 7,552,340 B2 | 6/2009 | Ooi et al. |
| 7,586,537 B2 | 9/2009 | Konishi et al. |
| D606,105 S | 12/2009 | Hinkel |
| 7,646,425 B2 | 1/2010 | Bohaker et al. |
| D610,601 S | 2/2010 | Melder |
| D614,223 S | 4/2010 | Kim et al. |
| 7,705,882 B2 | 4/2010 | Engel et al. |
| D627,815 S | 11/2010 | Oba |
| D628,223 S | 11/2010 | Kao et al. |
| 7,930,369 B2 | 4/2011 | Marriott et al. |
| D638,461 S | 5/2011 | Kim et al. |
| 7,986,369 B1 | 7/2011 | Burns |
| D648,766 S | 11/2011 | Chen |
| D651,229 S | 12/2011 | Tan et al. |
| D651,230 S | 12/2011 | Tan et al. |
| 8,072,536 B1 | 12/2011 | Campbell |
| D651,633 S | 1/2012 | Park et al. |
| 8,139,122 B2 | 3/2012 | Rolston |
| D657,410 S | 4/2012 | Helaoui et al. |
| 8,165,146 B1 | 4/2012 | Melick et al. |
| 8,174,972 B2 | 5/2012 | Cernius et al. |
| 8,359,622 B1 | 1/2013 | Everson |
| D678,929 S | 3/2013 | Hancock |
| 8,402,145 B2 | 3/2013 | Holden et al. |
| 8,432,485 B1 | 4/2013 | Martinez et al. |
| D687,085 S | 7/2013 | Manson |
| 8,504,707 B2 | 8/2013 | Toebes et al. |
| D694,305 S | 11/2013 | Katori et al. |
| D697,119 S | 1/2014 | Park et al. |
| 8,625,024 B2 | 1/2014 | Hsu |
| D700,232 S | 2/2014 | Ramsay et al. |
| D719,205 S | 12/2014 | Matsumoto |
| D729,296 S | 5/2015 | Shelton |
| D730,422 S | 5/2015 | Kim et al. |
| 9,071,740 B1 | 6/2015 | Duffy |
| D733,781 S | 7/2015 | Chen |
| D734,801 S | 7/2015 | Yang |
| 9,102,055 B1 | 8/2015 | Konolige et al. |
| D740,871 S | 10/2015 | Moon et al. |
| D742,954 S | 11/2015 | Simonelli et al. |
| D743,465 S | 11/2015 | Aglassinger et al. |
| D745,916 S | 12/2015 | Oh |
| D746,350 S | 12/2015 | Li |
| D748,709 S | 2/2016 | Jeong |

(56) References Cited

U.S. PATENT DOCUMENTS

| | | | |
|---|---|---|---|
| D755,880 S | 5/2016 | Luo et al. | |
| 9,330,307 B2 | 5/2016 | Litvak et al. | |
| 9,386,230 B1 | 7/2016 | Duran et al. | |
| 9,544,485 B2 | 1/2017 | Conner | |
| 2001/0015760 A1 | 8/2001 | Fellegara | |
| 2002/0003575 A1* | 1/2002 | Marchese | G06F 17/3025 348/231.99 |
| 2002/0056794 A1 | 5/2002 | Ibrahim | |
| 2002/0107591 A1 | 8/2002 | Gabai et al. | |
| 2002/0141418 A1 | 10/2002 | Ben-Dor et al. | |
| 2002/0186317 A1 | 12/2002 | Kayanuma | |
| 2002/0191082 A1 | 12/2002 | Fujino et al. | |
| 2003/0164881 A1 | 9/2003 | Ohe et al. | |
| 2003/0169354 A1 | 9/2003 | Aotsuka | |
| 2003/0193409 A1 | 10/2003 | Crank | |
| 2003/0216151 A1 | 11/2003 | Kitano et al. | |
| 2004/0132489 A1* | 7/2004 | Ryley | H04M 1/6033 455/556.1 |
| 2004/0211868 A1 | 10/2004 | Holmes et al. | |
| 2004/0246341 A1 | 12/2004 | Lee et al. | |
| 2004/0247203 A1 | 12/2004 | Dell'Eva | |
| 2005/0062720 A1 | 3/2005 | Rotzoll et al. | |
| 2005/0073575 A1* | 4/2005 | Thacher | H04N 7/141 348/14.13 |
| 2005/0128336 A1 | 6/2005 | Toledano et al. | |
| 2005/0149213 A1 | 7/2005 | Guzak et al. | |
| 2005/0151042 A1 | 7/2005 | Watson | |
| 2005/0200751 A1 | 9/2005 | Weaver | |
| 2005/0212958 A1 | 9/2005 | Su et al. | |
| 2005/0227217 A1 | 10/2005 | Wilson | |
| 2005/0230583 A1 | 10/2005 | Wu | |
| 2005/0237425 A1* | 10/2005 | Lee | H04N 1/19594 348/373 |
| 2005/0243022 A1 | 11/2005 | Negru | |
| 2005/0243199 A1 | 11/2005 | Bohaker et al. | |
| 2005/0275723 A1 | 12/2005 | Sablak et al. | |
| 2006/0017842 A1 | 1/2006 | Jun | |
| 2006/0024046 A1 | 2/2006 | Jones et al. | |
| 2006/0086871 A1 | 4/2006 | Joseph et al. | |
| 2006/0109375 A1* | 5/2006 | Ho | H04N 5/2251 348/376 |
| 2006/0109613 A1* | 5/2006 | Chen | G06F 1/1605 361/679.23 |
| 2006/0123129 A1 | 6/2006 | Toebes et al. | |
| 2006/0123166 A1 | 6/2006 | Toebes et al. | |
| 2006/0210259 A1 | 9/2006 | Matsumoto | |
| 2006/0238707 A1 | 10/2006 | Elvesjo | |
| 2006/0244583 A1 | 11/2006 | Kawada | |
| 2006/0262194 A1 | 11/2006 | Swain | |
| 2006/0282866 A1 | 12/2006 | Kuo | |
| 2007/0001087 A1 | 1/2007 | Shyu et al. | |
| 2007/0011375 A1 | 1/2007 | Kumar | |
| 2007/0036539 A1* | 2/2007 | Martinez | F16M 11/02 396/419 |
| 2007/0083791 A1 | 4/2007 | Panesar et al. | |
| 2007/0222888 A1 | 9/2007 | Xiao et al. | |
| 2008/0001547 A1 | 1/2008 | Negru | |
| 2008/0005432 A1 | 1/2008 | Kagawa | |
| 2008/0012980 A1 | 1/2008 | Yamane | |
| 2008/0056709 A1 | 3/2008 | Huang et al. | |
| 2008/0074535 A1 | 3/2008 | Ohsuga | |
| 2008/0151052 A1 | 6/2008 | Erel et al. | |
| 2008/0152218 A1 | 6/2008 | Okada et al. | |
| 2008/0186150 A1 | 8/2008 | Kao | |
| 2008/0189352 A1 | 8/2008 | Mitchell et al. | |
| 2008/0231699 A1 | 9/2008 | Konishi et al. | |
| 2008/0291260 A1 | 11/2008 | Dignan et al. | |
| 2008/0309765 A1* | 12/2008 | Dayan | H04N 7/185 348/158 |
| 2009/0019187 A1 | 1/2009 | Okuma | |
| 2009/0027570 A1 | 1/2009 | Fujinawa | |
| 2009/0069633 A1 | 3/2009 | Orihara et al. | |
| 2009/0102715 A1 | 4/2009 | Lou et al. | |
| 2009/0141918 A1 | 6/2009 | Chris et al. | |
| 2009/0141939 A1* | 6/2009 | Chambers | G08B 13/19613 382/103 |
| 2009/0175612 A1 | 7/2009 | Wen | |
| 2009/0195655 A1* | 8/2009 | Pandey | G08B 13/19647 348/158 |
| 2009/0245268 A1 | 10/2009 | Pugliese, IV | |
| 2009/0248918 A1 | 10/2009 | Diab et al. | |
| 2009/0289921 A1 | 11/2009 | Mickelson et al. | |
| 2009/0296735 A1 | 12/2009 | Cernius et al. | |
| 2009/0309969 A1* | 12/2009 | Wendler | F16M 11/041 348/143 |
| 2010/0026811 A1* | 2/2010 | Palmer | H04N 7/181 348/159 |
| 2010/0039253 A1 | 2/2010 | Zang et al. | |
| 2010/0076600 A1* | 3/2010 | Cross | H04N 7/15 700/259 |
| 2010/0085749 A1 | 4/2010 | Bezgachev et al. | |
| 2010/0109878 A1* | 5/2010 | Desrosiers | H04N 7/185 340/573.4 |
| 2010/0180012 A1 | 7/2010 | Heo et al. | |
| 2010/0199157 A1 | 8/2010 | Takaoka et al. | |
| 2010/0271053 A1 | 10/2010 | Safaee-Rad et al. | |
| 2010/0306399 A1 | 12/2010 | Khosravi et al. | |
| 2010/0314508 A1 | 12/2010 | Bevirt et al. | |
| 2010/0328475 A1 | 12/2010 | Thomas et al. | |
| 2010/0330843 A1 | 12/2010 | Gao | |
| 2011/0007159 A1* | 1/2011 | Camp | H04N 7/183 348/143 |
| 2011/0102438 A1 | 5/2011 | Mathe et al. | |
| 2011/0102588 A1* | 5/2011 | Trundle | G08B 13/196 348/143 |
| 2011/0134243 A1 | 6/2011 | Siann et al. | |
| 2011/0134313 A1* | 6/2011 | Kato | G03B 17/54 348/373 |
| 2011/0158637 A1 | 6/2011 | Jung et al. | |
| 2011/0161076 A1* | 6/2011 | Davis | G06F 3/04842 704/231 |
| 2011/0193964 A1* | 8/2011 | McLeod | H04N 7/20 348/158 |
| 2011/0193967 A1 | 8/2011 | Matsumoto et al. | |
| 2011/0205965 A1 | 8/2011 | Sprigg et al. | |
| 2011/0231903 A1 | 9/2011 | Springer et al. | |
| 2011/0234803 A1 | 9/2011 | Nakajima et al. | |
| 2011/0255289 A1 | 10/2011 | Krah | |
| 2011/0267492 A1 | 11/2011 | Prentice et al. | |
| 2011/0285813 A1 | 11/2011 | Girdzijauskas et al. | |
| 2011/0293137 A1 | 12/2011 | Gurman et al. | |
| 2011/0299728 A1 | 12/2011 | Markovic et al. | |
| 2012/0081009 A1 | 4/2012 | Shteynberg | |
| 2012/0105632 A1* | 5/2012 | Renkis | G08B 13/19619 348/143 |
| 2012/0106037 A1 | 5/2012 | Diebel | |
| 2012/0127270 A1 | 5/2012 | Zhang et al. | |
| 2012/0140068 A1* | 6/2012 | Monroe | H04N 7/183 348/143 |
| 2012/0162416 A1* | 6/2012 | Su | G06T 7/2053 348/143 |
| 2012/0194650 A1 | 8/2012 | Izadi et al. | |
| 2012/0236373 A1 | 9/2012 | Oyama | |
| 2012/0246359 A1 | 9/2012 | Scragg, Jr. et al. | |
| 2012/0262575 A1* | 10/2012 | Champagne | H04N 7/185 348/143 |
| 2012/0263450 A1 | 10/2012 | Totani | |
| 2012/0328358 A1 | 12/2012 | Akiyama | |
| 2013/0053657 A1* | 2/2013 | Ziarno | A61B 1/00016 600/304 |
| 2013/0156260 A1 | 6/2013 | Craig | |
| 2013/0162629 A1 | 6/2013 | Huang et al. | |
| 2013/0314544 A1 | 11/2013 | Ban | |
| 2013/0321564 A1 | 12/2013 | Smith et al. | |
| 2013/0342653 A1 | 12/2013 | McCloskey et al. | |
| 2014/0032796 A1 | 1/2014 | Krause | |
| 2014/0047143 A1 | 2/2014 | Bateman et al. | |
| 2014/0049609 A1 | 2/2014 | Wilson et al. | |
| 2014/0119604 A1 | 5/2014 | Mai et al. | |
| 2014/0168421 A1 | 6/2014 | Xu et al. | |
| 2014/0241387 A1 | 8/2014 | Ortiz | |
| 2014/0270387 A1 | 9/2014 | Hoof et al. | |

(56) References Cited

U.S. PATENT DOCUMENTS

| | | |
|---|---|---|
| 2014/0333726 A1 | 11/2014 | Tokui et al. |
| 2014/0375635 A1 | 12/2014 | Johnson et al. |
| 2015/0052029 A1 | 2/2015 | Wu et al. |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0228114 A1 | 8/2015 | Shapira et al. |
| 2016/0012588 A1 | 1/2016 | Taguchi et al. |
| 2016/0022181 A1 | 1/2016 | Valsan et al. |
| 2016/0029102 A1* | 1/2016 | Daily ............... H04N 21/812 725/93 |
| 2016/0094763 A1 | 3/2016 | Patel |
| 2016/0094829 A1 | 3/2016 | Georgiev et al. |
| 2016/0142681 A1 | 5/2016 | Yu |
| 2016/0261829 A1 | 9/2016 | Olsson et al. |

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.
Adipranata, Fast method for multiple human face segmentation in color image, 2008 Second Int'l Conference on Future Generation Communication and Networking, IEEE, 2008, 4 pgs.
Buy Svb Ladybird Tripod Webcam 4 Mega Pixel—4 Megapixel Web Cam Online, Best Prices in India: Rediff Shopping, Dec. 16, 2015, 3 pgs.
Drivers—Video Cam: Download Drivers for (Genius VideoCAM NB) Visual/Video Camera, Computer Question Help, Jul. 3, 2008, 2 pgs.
Ebay, Belkin F7D7601AU, Net Cam IP WIFI Baby Pet Monitor Camera Security Night Vision, Dec. 15, 2015, 5 pgs.
Ebay, Lot of 2 USB WebCam Web Cam Camera Logitech Quickcam HP Hewlett Packard, Dec. 16, 2015, 3 pgs.
Ebay, Motorola, MBP421 Digital Video & Sound Rechargeable Baby Monitor 1.8" LCD Screen, Dec. 15, 2015, 5 pgs.
Ebay, New Smallest Mini Camera Camcorder Video Recorder DVR Spy Hidden Pinhole Web Cam, Dec. 2, 2015, 4 pgs.
FabulaTech, What is USB for Remote Desktop, Dec. 12, 2011, 2 pgs, http://we.archive.org/web/20111212070644/http://www.usb-over-network.com/usb-for-remote-desktop.html.
FabulaTech, What is USB over Network, Dec. 17, 2011, 2 pgs, http://web.archive.org/web/20111217080253/http://www.usb-over-network.com/usb-over-network.html.
Goods in Stock PC Camera USB Plug and Play Free Driver Digital Webcam Stand Web Camera, Dec. 18, 2015, 12 pgs.
Hampapur, Smart surveillance: application, technologies and implications, Information Communications and Signal Processing 2, 2003, pp. 1133-1138.
Heo, Fusion of visual and thermal face recognition techniques: A comparative study. Univ. of Tennessee, Knoxville, TN, 2003, 75 pgs.
Input Devices on Pintrest, Computer, Mice and Apples, Tanna Darty, Dec. 15, 2015, 1 pg.
Ion Camera, The Home Pro Wi-Fi Wireless Cloud Video Monitoring Security Camera (Black): Camera & Photo, Dec. 15, 2015, 6 pgs.
Joel Johnson, Glowdoodle Turns Your Crappy Webcam in a Crappier Webcam (in a good way), webcam—Boing Boing, Dec. 16, 2015, 8 pgs.
John Lewis, Samsung SEB-1019RW Add-On Night Vision Baby Monitor Camera, Dec. 15, 2015, 2 pgs.
KYO-TUX, IconArchive, Device WebCam Icon, Phuzion Iconset, Jun. 8, 2010, 3 pgs.
Linksys Wireless-N Internet Home Monitoring Camera: Home Security Systems: Camera & Photo, Amazon.com, Dec. 15, 2015, 7 pgs.
Logi Circle: Portable Home Surveillance Camera from Logitech (video), AppleApple.Top World News, Feb. 10, 2015, 5 pgs.
Mini Universal Tripod Stand for Digital Camera and Webcam A33-in Tripods from Consumer Electronics on Aliexpress.com, Alibaba, Alibaba Group, Store: Angel One-Stop Shopping Center, Dec. 16, 2015, 3 pgs.
Parent, Android USB Port Forwarding, Dec. 26, 2011, 7 pgs, http://www.codeproject.com/Articles/191930/Android-Usb-Port-Forwarding.
Restore.Solutions, Numus Software, USB/VID, Syntek Web Cam Device Drivers, Dec. 12, 2015, 10 pgs.
Silberman, Indoor Segmentation and Support Ingerence from RGBD Images, Computer Vision—ECCV 2012, Springer Berlin Heidelbert, Oct. 2012, pp. 746-780.
SIV Ai-Ball Very Small Hidden IP Network Camera Battery Powered Wireless IP Camera, Alibaba.com, 1999-2015, 7 pgs.
TechAllianz, How to Pick the Right Webcam, Satyakam, Jan. 22, 2013, 4 pgs.
TREK Ai-Ball Mini WiFi Spy Cam IP Wireless Camera for Iphone / Android /Ipad, Tmart, www.tmart.com, Dec. 18, 2015, 6 pgs.
Tripod Support for a QuickCam (or other webcam), Instructables, 2015, 3 pgs.
USB/IP Project, USB Request Over IP Network, Dec. 27, 2011, 5 pgs, http://web.archive.org/web/20111227171215/http://usbip.sourceforge.net/.
Web Camera 6 Stock Photo, Dreamstime, Dec. 16, 2015, 2 pgs.

* cited by examiner

Side View I

Side View II

Front View

Bottom View

HOME VIDEO CAPTURING AND MONITORING SYSTEM

CROSS REFERENCE TO OTHER APPLICATIONS

The present application is a continuation of U.S. patent application Ser. No. 14/701,283, filed on Apr. 30, 2015, titled "Modular Camera System," which is a continuation of U.S. Utility patent application Ser. No. 13/604,399, filed Sep. 5, 2012, titled "Modular Camera System," now U.S. Pat. No. 9,071,740, which claims priority to U.S. Provisional Patent Application No. 61/552,821, filed Oct. 28, 2011, titled "Modular Camera System." Content of each of the above applications is hereby incorporated by reference in its entirety.

The present application is also related to U.S. patent application Ser. No. 15/062,006, filed on Mar. 4, 2016, titled "Camera Module," and U.S. patent application Ser. No. 15/062,016, filed on Mar. 4, 2016, titled "Integrated Video Camera Module." Each of these two applications is hereby incorporated by reference in its entirety.

BACKGROUND

Internet Protocol (IP) cameras connect to a network and transmit data using networking protocols. Many IP cameras are designed to be placed on a surface (e.g., a desktop) and as such include a flat base (which comes into contact with the desktop or other surface) which supports the camera. IP cameras so constructed cannot be easily mounted to different locations or surfaces (e.g., to a wall where drilling a hole is not possible or permitted) or used in different conditions (e.g., indoor/outdoor, night/day, mobile/stationary, etc.). New cameras and/or camera accessories which overcome some or all of these shortcomings would be desirable.

BRIEF DESCRIPTION OF THE DRAWINGS

Various embodiments of the invention are disclosed in the following detailed description and the accompanying drawings.

DESCRIPTION OF IMPLEMENTATIONS

Figure 1:
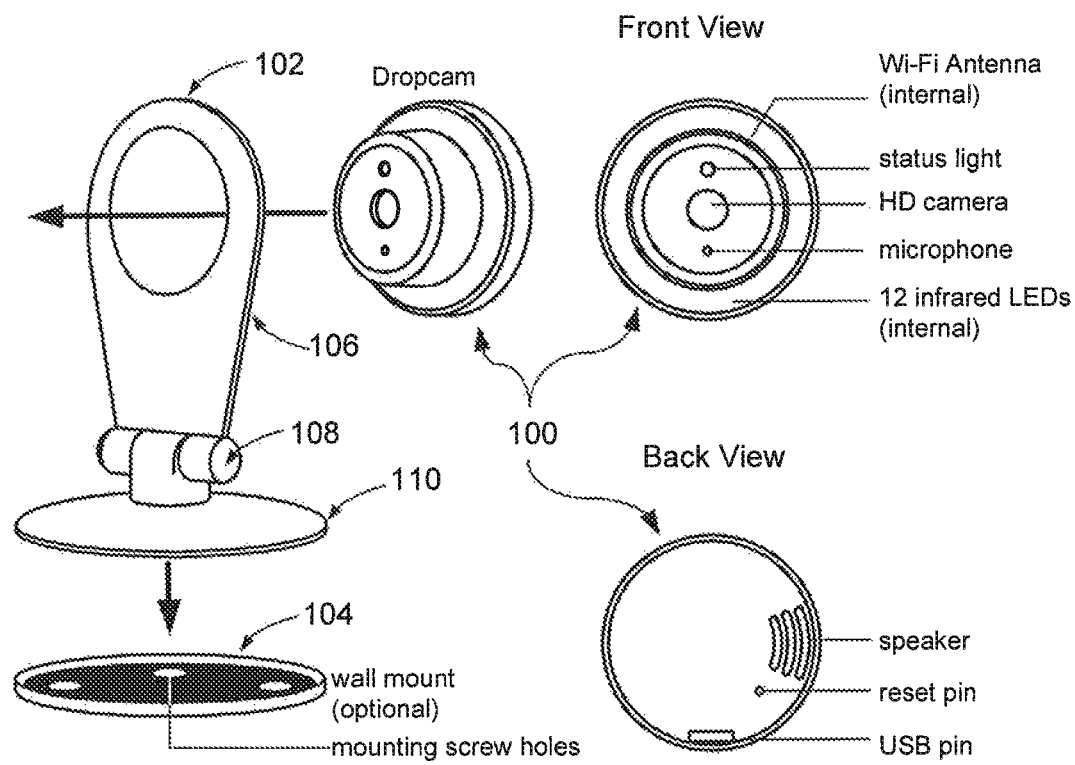
FIG. 1 is a diagram showing an embodiment of a housing which includes an arm, joint, and base.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of housings for a video camera are described herein. Oftentimes video cameras (especially high definition (HD) video cameras) are relatively expensive (e.g., as high as $500) and a user may not want to buy multiple cameras for different purposes. In some embodiments, a user purchases multiple housings (e.g., priced on the order of $30 or less) and uses the same camera with a selected one of the housings when a certain utility or application is desired (e.g., depending upon the location to be captured by the camera or the nature of the video recording). In some cases, a housing is semi-permanently installed or mounted in a location. For example, a user may use a camera as a security camera when the user is away on vacation or traveling for work. An outdoor housing may be kept installed or mounted near a front door or other entrance to the home, even though the user may not always use the camera as a security monitor and/or the camera may not always be in the outdoor housing. This may make it easier when the camera is used for that purpose since the camera will be pointing in the desired direction and the user does not have to re-mount the outdoor housing each time.

The housings described herein are exemplary and are not intended to be limiting. For example, any dimensions, shapes, styles, and/or materials described herein are exemplary and are not intended to be limiting. Drawings are not to scale. For brevity, features or characters described in association with one embodiment may not necessarily be repeated or reiterated when describing another embodiment. Even though it may not be explicitly described therein, a feature or characteristic described in association with one embodiment may be used by another embodiment.

FIG. 1 is a diagram showing an embodiment of a housing which includes an arm, joint, and base. In the example shown, camera 100 is a camera which is configured to be housed in or otherwise coupled to a variety of enclosures or housings, for example, at least temporarily until it is removed from a first housing and (if desired) placed in another housing. In some embodiments, module camera 100 is used as-is, without any housing.

Housing 102 and wall mount 104 show embodiments of a housing and mounting hardware, respectively. Housing 102 includes arm 106, joint 108, and base 110. Housing 102 is one example of a camera holder which includes a (in this case, circular) cutout configured to hold or otherwise support the video camera and/or point the video camera in a desired direction. To mount the camera on a wall, screws are drilled through the mounting screw holes to attach wall mount 104 to a wall in the desired location. Then, housing 102 is "popped" into wall mount 104. The proper angle for video recording by camera 100 is achieved by rotating the housing within mount 104 and/or by pivoting housing 102 forwards or backwards (e.g., bending at joint 108). In various embodiments, camera 100 is inserted into housing 102 before housing 102 is coupled with mount 104, or afterwards as desired.

Compared to some other cameras, camera 100 when used with housing 102 and mount 104 may have a much lower profile, so that it is closer to the wall than some other cameras. Also, installation may be much easier using housing 102 and mount 104. Some other cameras may require screws to be installed alone (e.g., without any guide or mount as shown here) and then the camera is positioned so that the screw heads fit into openings in the housing of the camera, mounting the camera to the wall. One problem with this is that it may be difficult to insert the screw heads into the opening and get the camera to mount to the wall snugly (e.g., because the user cannot see inside the camera). In contrast, the example system shown herein permits housing 102 to rotate within mount 104.

In this embodiment, camera 100 includes a Wi-Fi antenna and includes a Wi-Fi transceiver (not shown) for communicating in a Wi-Fi network. In some embodiments, a user is able to view video captured by camera 100 remotely and/or via a network, for example from an Internet browser application (e.g., Microsoft's Internet Explorer or Mozilla Firefox) running on a computer, from a dedicated and/or downloaded application running on a smart phone, etc. Camera 100 includes a status light, indicating when the device is powered on and/or filming. For example, one color light may indicate the device is powered on but not recording and another color light may indicate filming; no light may indicate the device is powered off. Camera 100 further includes an HD (e.g., 720p, 1080p, or higher) camera, microphone, and 12 infrared (IR) light emitting diodes (LEDs). (Exemplary configurations or features described in association with this figure (such as the pixel resolution of camera 100 or the number of LEDs) are exemplary and are not intended to be limiting.) If light is low, camera 100 is configured to use the IR LEDs to operate in a nighttime mode. In this particular example, the IR LEDs are not visible from the exterior since they are enclosed with a dark-colored, IR-transparent plastic. Since the plastic permits infrared light to pass through it, the camera can function when the lighting is poor and the IR LEDs are used. Camera 100 further includes a speaker (e.g., so a person viewing video from the camera can talk to someone being filmed by the camera). Camera 100 includes a Universal Serial Bus port (i.e., female adapter) to which a USB plug (i.e., male adapter) is able to be coupled in order to supply power and (during an installation mode) is used as an input/output interface via which information about the Wi-Fi network is supplied to camera 100 (e.g., name of the Wi-Fi network to become a member of, an encryption key, etc.). In various embodiments, a USB connector is a Type A, Type B, Mini-A, Mini-B, Micro-A, or Micro-B connector. The USB port may be used at other times and/or for other purposes. For example, batteries or solar power generators with USB connections may be used to power the device and make it portable. The USB port may also be used as an I/O interface for control or display. In some embodiments, video captured by camera 100 is stored and may be accessed and manipulated (e.g., copied to another storage devices, etc.) as desired.

Figure 2:
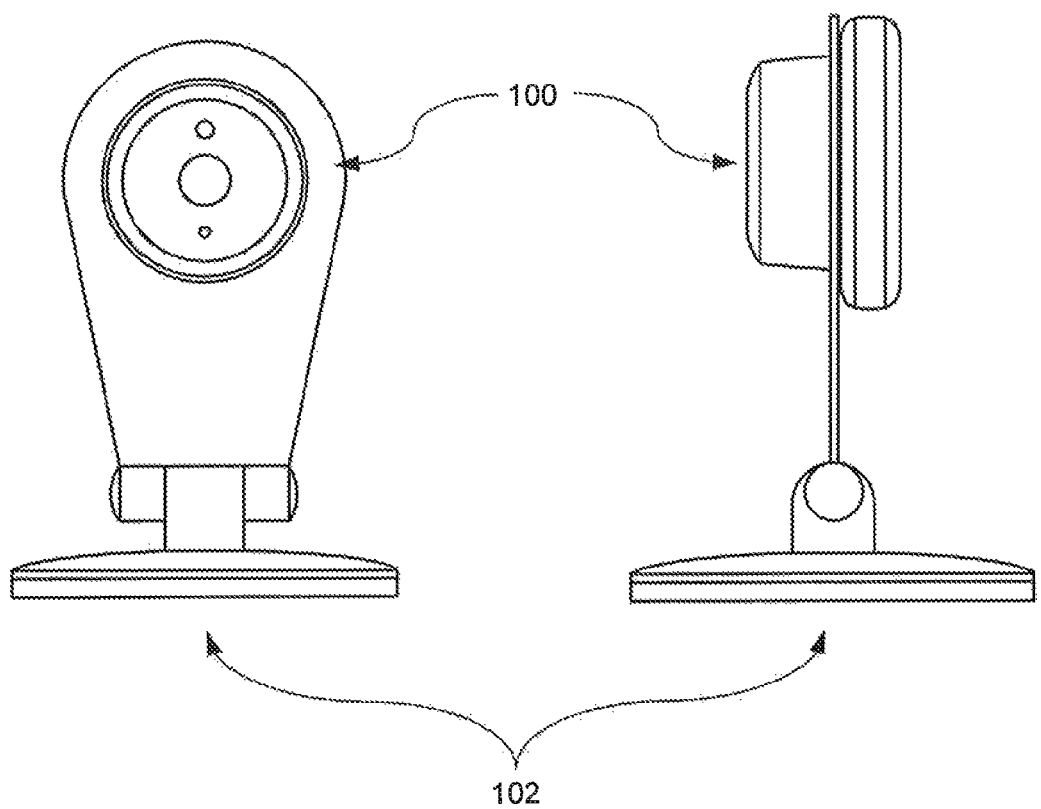
FIG. 2 shows a front view and a side view of an embodiment of a camera inserted in a housing.

FIG. 2 shows a front view and a side view of an embodiment of a camera inserted in a housing. In the example shown, camera 100 and housing 102 from FIG. 1 are shown. Camera 100 combined with housing 102 (and optionally further combined with mount 104, not shown) may be used in a variety of applications. In some embodiments, camera 100 is used as a baby camera, for example to monitor an already-sleeping child or to confirm that a child has gone to sleep. Camera 100 may be free standing (e.g., on a dresser) or may be mounted on a wall using mount 104. Other example uses include monitoring unsupervised nannies or maids, monitoring latchkey children before parents come home from work, video conferencing, pet cameras, as a store security camera to deter shoplifting or record evidence, etc.

Although the embodiments described herein show a circular camera and circular cutouts, in some embodiments, a camera may be some other shape. In such embodiments, the housings which are configured to house the camera correspondingly have different cut-outs or couplings for the camera.

In some cases, it may be desirable to use a camera outdoors and a housing is designed to withstand the elements and/or for outdoor mounting. The following figures show some embodiments of an outdoor housing for a camera.

Figure 3:
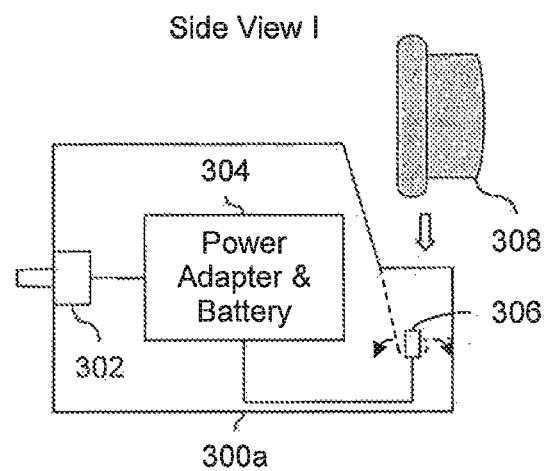
FIG. 3 is a diagram showing an embodiment of an outdoor housing for a camera with an AC power plug.
Figure 3:
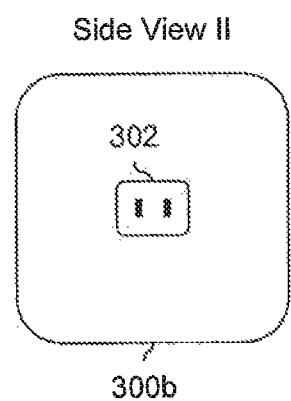
Figure 3:
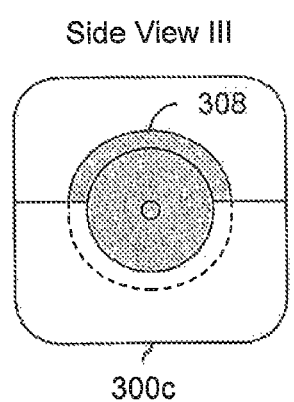

FIG. 3 is a diagram showing an embodiment of an outdoor housing for a camera with an AC power plug. In the example shown, views 300a-300c show an outdoor housing for a camera from first, second, and third side views, respectively. As shown in view 300a, the housing includes AC power plug 302, power adapter and battery 304, and mini-USB plug 306 Electrically, power is received from AC power plug 302 which is used to charge a battery within power adapter and battery 304. AC power plug 302 and power adapter and battery 304 are two examples of a power supply which is electrically coupled to a video camera.

In the event there is a power outage (or, for whatever reason, AC power plug 302 no longer supplies power), camera 308 will be able to operate for at least some additional time with the power stored in power adapter and battery 304. Power is supplied to camera 308 from power adapter and battery 304 via USB plug 306. As described above, the configurations and features described in association with this figure are merely exemplary and are not intended to be limiting. For example, although this exemplary camera system has a USB connection, other embodiments use other types of connections to exchange power (e.g., Power over Ethernet (POE)) and/or to exchange data (e.g., Ethernet).

Mechanically, camera 308 is coupled to the housing in view 300a by inserting camera 308 into an opening of the housing so that USB plug 306 is inserted into the USB port (not shown) of camera 308. USB plug 306 is one example of a connector in a housing which is configured to be physically coupled to a camera. In this particular example, USB plug 306 is not designed to be pulled out of the housing in view 300a and the housing of view 300a has a cutout matching the shape of camera 308 to aid in insertion of camera 308. In some other embodiments, there is some slack in a wire connecting a USB plug to a power adapter and battery; this permits a USB plug to be pulled out of a housing (e.g., for improved visibility and easy insertion). Connection occurs by pulling out a USB plug, inserting the plug into a camera (while being able to view and align the USB plug and port), and then inserting the coupled USB plug and camera into the opening of the outdoor housing. To attach or connect the system to a wall or other surface, AC power plug 302 is inserted into an AC power outlet. AC power plug 302 is one example of a surface mount which is configured to (at least temporarily) connect the system to a wall or other surface.

Since outdoor power outlets are located at various heights above ground, USB plug 306 is adjustable and the outdoor housing in view 300a has a slanted surface, permitting camera 308 to be angled forward or backward. If the housing in view 300a is coupled to an outdoor power outlet which is relatively high above ground (e.g., close to a roofline), then camera 308 may be angled forward using adjustable USB plug 306 in order to monitor things below. Conversely, camera 308 may be angled backwards if an outdoor power outlet is located relatively low to the ground. In various embodiments, a housing may be configured to permit a variety of adjustments in a variety of directions or axes (e.g., horizontally from left to right).

Although view 300a shows AC power plug 302 as being side mounted, in some other embodiments, some other orientation or placement is used (e.g., a top mounted or a side mounted AC power plug).

View 300b shows a second side view of the example housing, looking at it from the side that includes AC power plug 302. View 300c shows a third side view of the example housing, looking at it from the side that includes camera 308. For clarity, camera 308 is shaded.

Figure 4:
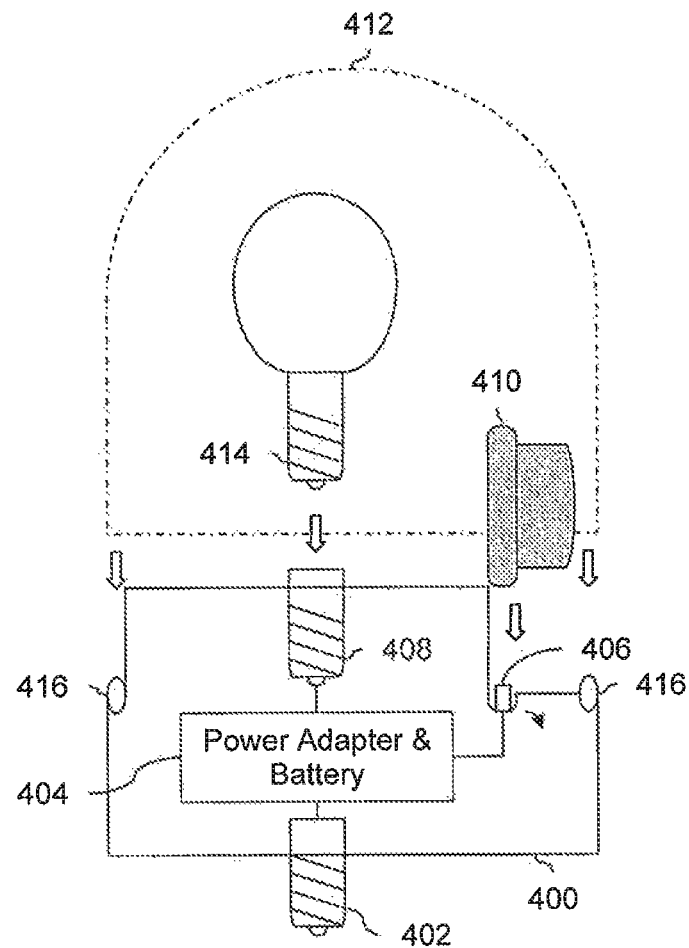
FIG. 4 is a diagram showing an embodiment of an outdoor housing for a camera with light bulb connectors.

FIG. 4 is a diagram showing an embodiment of an outdoor housing for a camera with light bulb connectors. In the example shown, housing 400 includes light bulb outlet plug 402, power adapter and battery 404, USB plug 406, and light bulb port 408. Housing 400 is designed to screw into a light bulb outlet, such as a porch light or other outdoor lighting fixture, using light bulb outlet plug 402. Since many outdoor light outlets are designed to have a light bulb oriented upwards, light bulb outlet plug 402 is on the bottom of housing 400. Alternatively, a light bulb outlet plug may be on some other surface (e.g., side or top mounted). Light bulb outlet plug 402 is another example of a surface mount which (at least temporarily) connects the system to a lighting fixture (or, more generally, a surface).

Electrically, power goes from light bulb outlet plug 402 to power adapter and battery 404. As in the housing embodiments described above, the battery in power adapter and battery 404 permits a camera to operate even if power from light bulb outlet plug 402 is lost. Power adapter and battery 404 powers both USB plug 406 and light bulb port 408. Light bulb 414 is coupled to and powered by light bulb port 408. This permits a camera to be powered using an outdoor lighting fixture (such as a porch light), without depriving the area of light.

Camera 410 is coupled to housing 400 via USB plug 406. As described above, USB plug 406 and/or the wire between power adapter and battery 404 and USB plug 406 may be configured in a variety of ways to make insertion of camera 410 easier. For example, porch lights tend to be relatively high off the ground and even tall people may have difficulty inserting camera 410 into housing 400 when housing 400 is already coupled to an outdoor lighting fixture. (Housing 400 may, for example, be coupled to a lighting fixture all the time and camera 410 is only inserted when the homeowners plan to be away from home for an extended period of time.) Easy insertion and removal of camera 410 would be desirable.

In this particular example, USB plug 406 is able to be bent forward so that camera 410 can be angled forward. As described above, most outdoor lighting fixtures are relatively high off the ground and an expected configuration may be to angle camera 410 downwards. Although not shown herein, in some embodiments a housing is configured so that a camera can be angled backwards (i.e., to look up) and/or adjusted horizontally (i.e., left/right).

Dome 412 encloses light bulb 414 and is connected to housing 400. The rounded shape of dome 412 is merely exemplary and in some embodiments a variety of covers in different colors, styles, finishes, and so on are available so that people can choose the cover that suites the style of a house and/or a homeowner's taste. Similarly, housing 400 may be available in a variety of colors, styles, and finishes. Universal connectors 416 ensure that any of the housings will be able to fit any of the covers. The shape of universal connectors 416 is merely exemplary and a variety of connectors (e.g., nuts and bolts, clamps, etc.) may be used.

In some embodiments, housing 400 further includes a light sensor (not shown) which turns off the power supplied to light bulb port 408 (and thus light bulb 414) from power adapter and battery 404 when it is light outside and turns on power when it is dark outside. This (for example) permits a light switch controlling a porch light or other outdoor light fixture to always be on without wasting power to power light bulb 414 when not needed.

If left outdoors for an extended period of time, dome 412 may become dirty and affect the quality of the video captured by camera 410. In some embodiments, a monitoring process is performed, which alerts a user when the monitoring process determines a dome or other cover to be too dirty. In various embodiments, a monitoring process is performed on camera 410 or at a server to which video is uploaded (e.g., www.dropcam.com). In some embodiments, video captured by camera 410 is analyzed to detect when dome 412 is too dirty. For example, an amount of light may be measured or otherwise determined from the video. In some embodiments, if an amount of light at a fixed or predefined time of day (e.g., noon) drops below a threshold, then it is determined a cover is getting dirty. The threshold may vary based on location and/or time of year (e.g., Ohio in winter versus Florida in summer). In some embodiments, a monitoring process looks for a drop in light levels by comparing amounts of light at the same time of day and/or time of year (e.g., an amount of light at 2 PM on Aug. 1, 2012 versus an amount of light at 2 PM on Aug. 1, 2009, or an amount of light at 2 PM on August of 2012 versus an amount of light at 2 PM on August of 2009). In some embodiments, the first few minutes captured by the camera are set to be a clean image or clean level and a monitoring process measures a change between current conditions and the clean image or level. In various embodiments, an email notification is sent and/or a user is presented with a warning message when logging on to a (e.g., cloud-based) video system.

Figure 5:
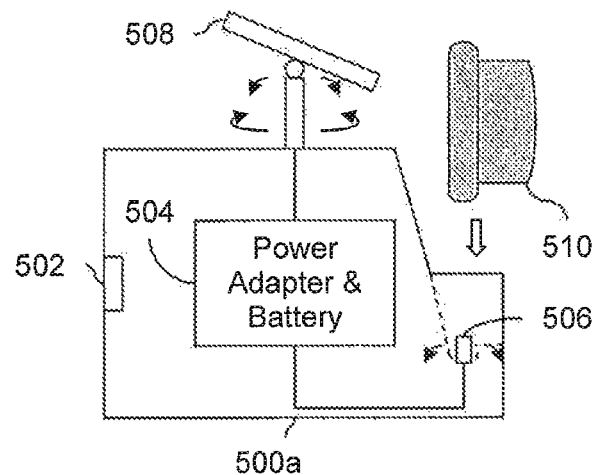
FIG. 5 is a diagram showing an embodiment of an outdoor housing with a solar panel.
Figure 5:
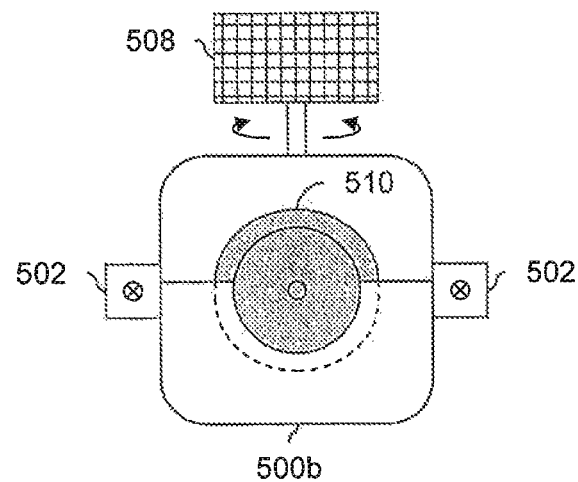

FIG. 5 is a diagram showing an embodiment of an outdoor housing with a solar panel. In the example shown, views 500a and 500b show the first and second side view, respectively, of an outdoor housing with a solar panel. In some embodiments, the housing shown is used where there is no outdoor AC power outlet or outdoor lighting fixture (e.g., a shed or other structure with no power supply).

As shown in view 500a, the exemplary housing includes wall mounting hardware 502, power adapter and battery 504, USB plug 506, and solar panel 508. The position of solar panel 508 is able to be adjusted (e.g., forwards/backwards as well as pivoting on the stand) so that light exposure is maximized. Power from solar panel 508 is passed to and stored by power adapter and battery 504. From there, power is supplied to USB plug 506 for camera 510 operation.

View 500b shows how wall mounting hardware 502 is used to mount the exemplary housing to an outdoor wall or other surface. In this example, screws are used to hold the housing of view 500b in place. In some other embodiments, some other connectors or hardware may be used.

In some cases, it may be desirable to use a camera indoors but a flat surface is not available. Alternatively, a flat surface is available but it is undesirable to place a camera there. The following figures show some embodiments of indoor housings which may be used in such situations.

Figure 6:
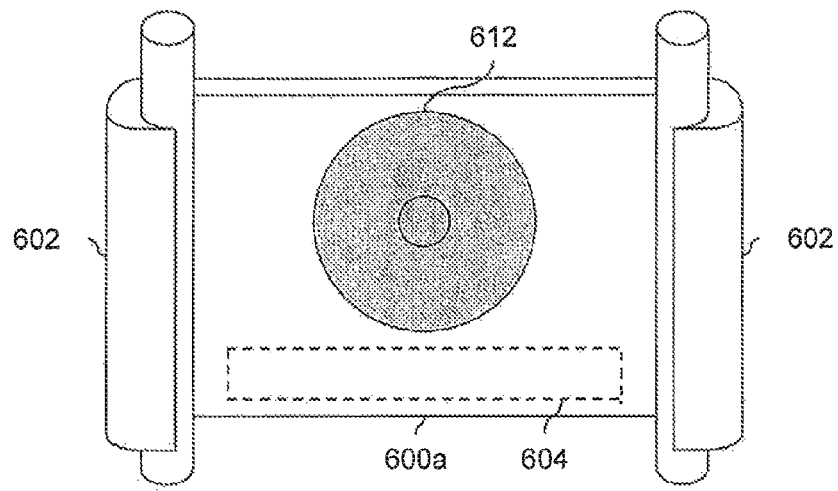
FIG. 6 is a diagram showing an embodiment of a housing with side grippers.
Figure 6:
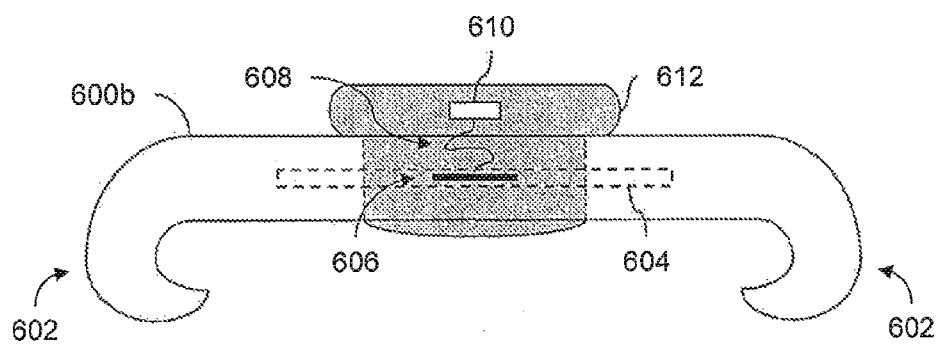

FIG. 6 is a diagram showing an embodiment of a housing with side grippers. In the example shown, view 600a shows a front view of the exemplary housing, which includes side grippers 602 which are designed to wrap around vertical poles or bars. Some examples include attaching the exemplary housing to the side of a crib, or to the handrail of a staircase, balcony, or landing. Side grippers 602 (and in some embodiments, the entire housing) are made of flexible and/or material that grips, such as rubber. Side grippers 602 are bent backwards, wrapped around the desired poles or bars, and released. The exemplary housing and the camera are relatively light so the surface friction of side grippers 602 is sufficient to hold the housing in place.

View 600b shows a bottom view. As shown in view 600b, camera 612 is inserted from the back of the housing through a hole in the housing. Battery 604 is inside of the housing in view 600b and is not visible from the exterior. Wire 608 connects battery 604 to USB plug 610, which in turn is plugged into camera 612 to supply power. View 600b includes opening 606 where excess wire can be tucked back into the body of the housing in view 600b. In some embodiments, the edge of 606 is elastic so that opening 606 can be stretched open when wire 608 is being inserted or removed but otherwise remains relatively closed, keeping excess wire inside the exemplary housing.

In some embodiments, battery 604 is charged using USB plug 610. In some embodiments, battery 604 is removable so that charged batteries can be swapped in for discharged batteries with minimal interruption to camera 612. In such embodiments, opening 606 may be wider to accommodate the insertion and removal of battery 604. In some embodiments, power is able to be supplied from an AC power source and/or via a power cord (e.g., in addition to or as an alternative to battery power). For example, when used as a baby monitor, it may be desirable to have an unlimited power supply without worrying about how long a battery will last.

Figure 7:
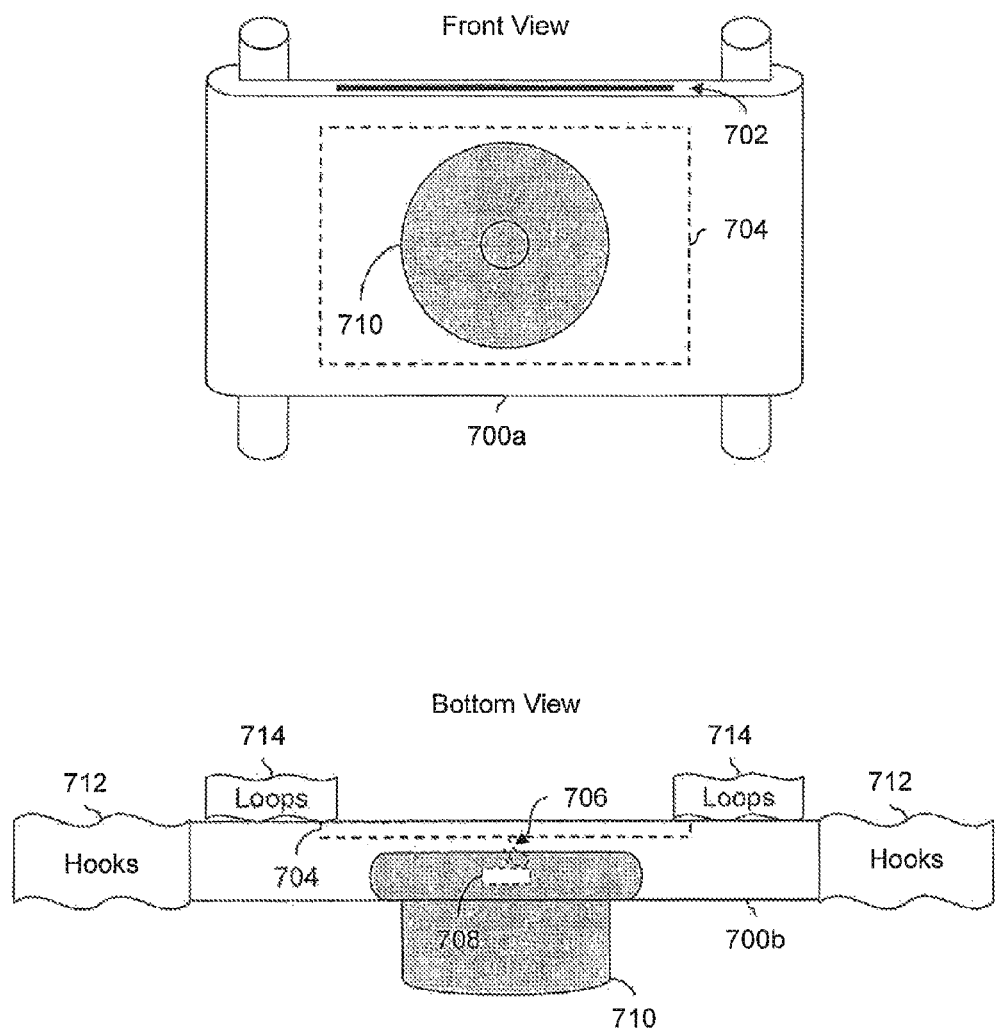
FIG. 7 is a diagram showing an embodiment of a housing with hook and loop fasteners.

FIG. 7 is a diagram showing an embodiment of a housing with hook and loop fasteners. In the example shown, the housing is similar to that shown in FIG. 6, in that they both are designed to be attached to vertical poles or bars, with some differences. View 700a shows a front view of the exemplary housing. Camera 710 is top loaded into a pocket or cavity in the housing of view 700a via opening 702. A round, front cutout in the housing permits at least part of camera 710 to be exposed on the front side of the housing. As described above, in some embodiments, the opening is elasticized. Since camera 710 is top loaded and not rear-loaded through a hole in the housing, battery 704 in this figure may be larger than battery 604 in FIG. 6. Another benefit to top loading is that the camera may be less likely to fall out of the housing.

View 700b shows a bottom view of the exemplary housing. When coupling camera 710 to the housing, USB plug 708 is pulled out of the body of the housing (e.g., via opening 702) and is connected to the USB port (not shown) of camera 710. Once coupled, USB plug 708 and camera 710 (plus any excess wire 706) are put in the body of the housing.

Hooks 712 and loops 714 (e.g., Velcro) are used to fasten the housing to vertical bars or poles by wrapping hooks 712 around the bar or pole and attaching it to loops 714. Naturally, the positioning of hooks 712 and loops 714 may be reversed. In some cases, hooks and loops may be preferred over the side grippers shown in FIG. 6 because hooks and loops may permit a wider range of distances between the bars or poles to which a housing is attached and/or a wider range of circumferences of such bars or poles.

Figure 8:
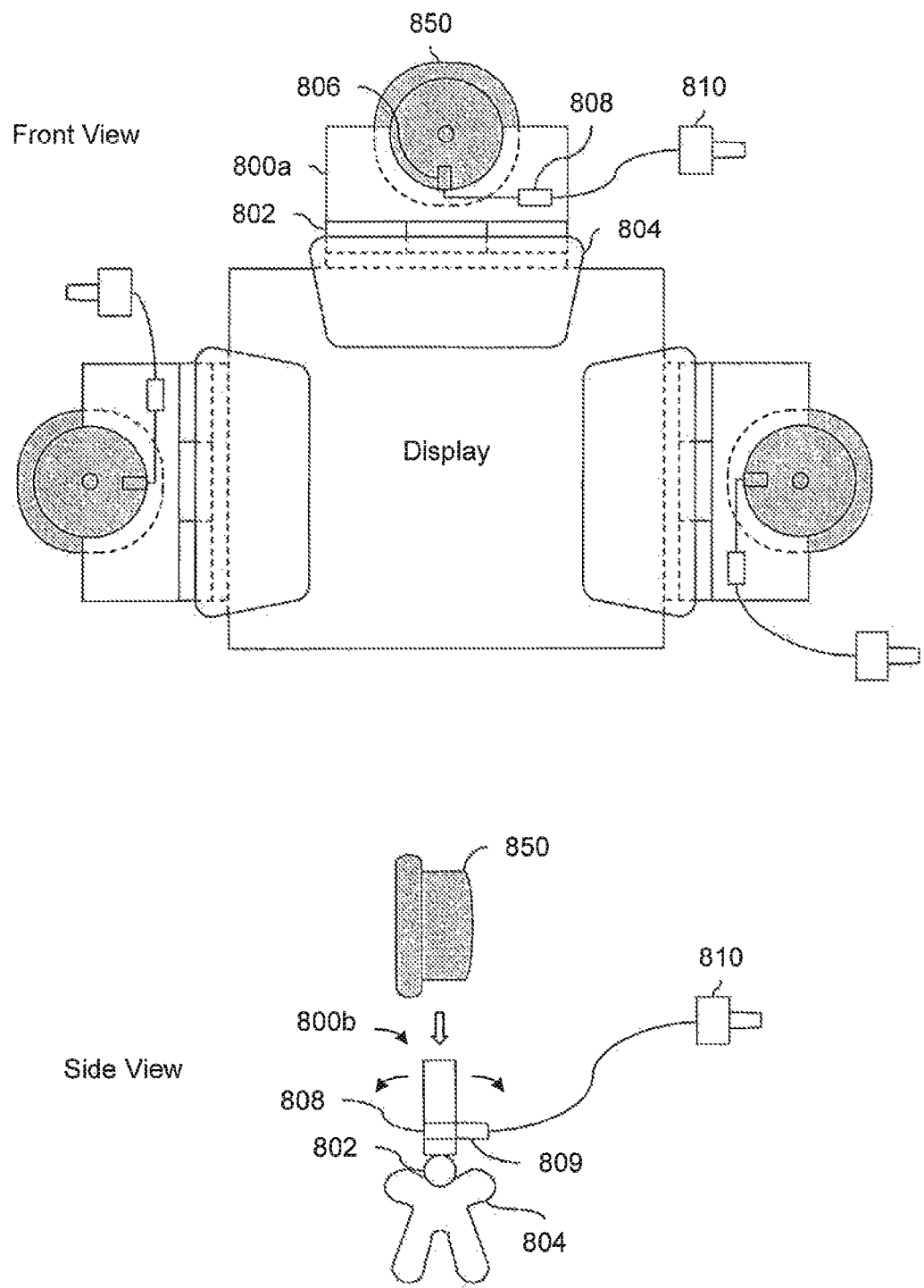
FIG. 8 is a diagram showing an embodiment of a housing with a clip.

FIG. 8 is a diagram showing an embodiment of a housing with a clip. In the example shown, housing in views 800a and 800b include clip 804 which is used to attach the housing to a display (e.g., a television or a computer monitor). Naturally, housing in views 800a and 800b may be attached to some other surfaces or things besides televisions or computer monitors.

Electrically, power is input from AC power plug 810. The power is passed to power adapter 808. In some embodiments, power adapter 808 includes a battery (e.g., in case there is a power outage). Power is passed from power adapter 808 to USB plug 806 of the housing in view 800a, which is connected to the USB port (not shown) of camera 850.

View 800a shows that the example housing has no top, which may be attractive for a variety of reasons. Camera 850 is relatively light, so the coupled USB port and plug are sufficient to hold camera 850 in place even when the coupled camera 850 and the housing in view 800a are attached to the left side or right side of the display. This design feature may make insertion/removal easier, may keep costs down, and produces a smaller and easier to store housing.

View 800b shows a side view of the example housing. To attach the housing of view 800b, the arms of clip 804 are pinched and the housing of view 800b is attached to the desired surface or object. Joint 802 permits the housing of view 800b (and camera 850, when coupled to the housing) to be angled forward or backward, so that the camera (when inserted in the housing) can be aimed at a desired object or space. View 800b also shows plug 809, which connects AC power plug 810 to power adapter 808. In this example, the wire which includes plug 809 and AC power plug 810 may be decoupled from the housing in view 800b for easier storage or transport. In some embodiments, a housing includes storage space for excess wire, such as a cavity with guides around which excess wire can be wrapped.

Figure 9:
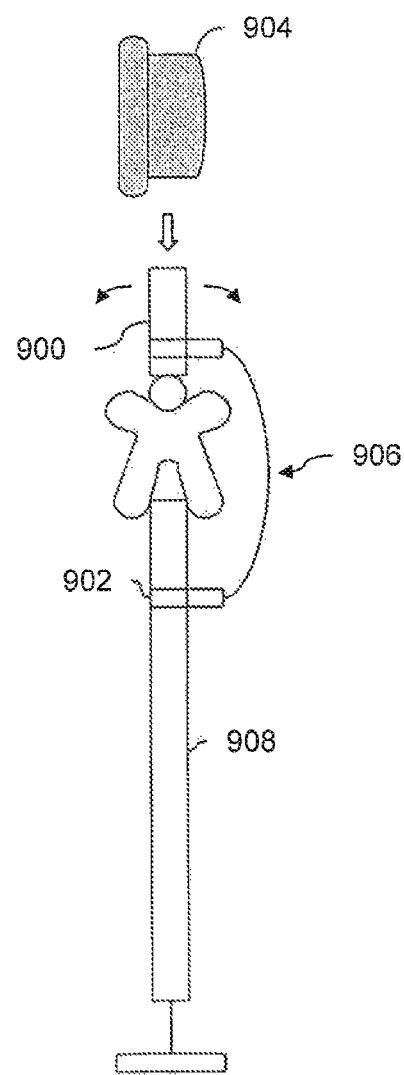
FIG. 9 is a diagram showing an embodiment of a housing which is configured to be connected to a port of a display.

FIG. 9 is a diagram showing an embodiment of a housing which is configured to be connected to a port of a display. In the example shown, display 908 includes port 902. Wire 906 connects housing 900 and display 908. In this particular example, wire 906 may be decoupled from housing 900 and/or display 908 (e.g., for easy storage).

In various embodiments, port 902 includes a power connection (e.g., from which camera 904 can be powered by display 908) and/or a data connection (e.g., via which video data captured by camera 904 can be sent over or to a network via display 908). Some examples of port 902 include (but are not limited to) a USB port (e.g., in a computer monitor), an Ethernet port (e.g., in a television with built-in networking capabilities), or a High-Definition Multimedia Interface (HDMI) port.

As an example of a port (902) which is capable of exchanging data, a user may subscribe to both television service and cable-based Internet service from a cable company and display 908 includes a built-in cable modem (not shown) or, more generally, a transceiver. In some such configurations, video data from camera 904 is uploaded to a server (e.g., www.dropcam.com) via port 902 and the built-in cable transceiver (not shown). A user may then (e.g., at some later time) access the uploaded video data by logging on to the server (not shown). In another example, display 908 may have built-in wireless capabilities (e.g., a built-in IEEE 802.11 a/b/g/n, also referred to as WiFi, transceiver). Display 908 may (e.g., if the system is so configured) send video data from camera 904 to a local display and/or receiver, such as a computer or smart phone on the same WiFi network as display 908 and/or a computer or smart phone in the same room or house as display 908. In yet another example, video data from camera 904 may be shown (e.g., directly) on display 908. The examples above are not intended to be mutually exclusive and the system may be configured to perform any combination of the above.

In order to communicate according to the protocols and/or communications interfaces supported by port 902, housing 900 may include appropriate components (e.g., encoders/decoders, modulators/demodulators, and/or communications interfaces) as needed. For example, housing 900 may include components and/or hardware associated with HDMI, USB, and so on. In some embodiments, these components are implemented as semiconductor devices, such as an application-specific integrated circuit (ASIC) or a field-programmable gate array (FPGA).

A housing which is configured to be connected to a power and/or data port of a display may be attractive for a variety of reasons. For example, it may be unsightly to have cables or wires running from camera 904 to an AC power outlet (e.g., if display 908 is a wall-mounted television and there are no other visible wires). AC power outlets may also be at a premium and using display 908 to power camera 904 frees up an AC power outlet for another device. Although camera 904 includes wireless capabilities and can transmit video data wirelessly, it may be desirable to transmit video data over a wire line connection via display 908 (e.g., over cable-based Internet service) since a wire line connection may be less noisy and/or may have higher data transmission rates than a wireless connection.

Figure 10:
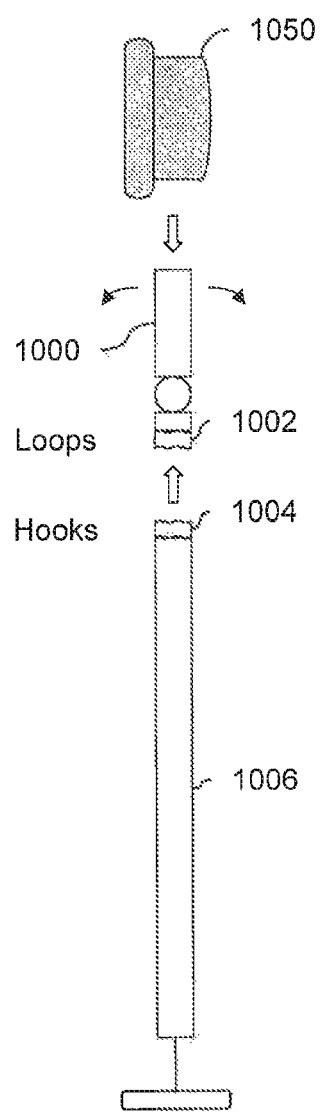
FIG. 10 is a diagram showing an embodiment of a housing which is configured to be connected to a display using hooks and loops.

FIG. 10 is a diagram showing an embodiment of a housing which is configured to be connected to a display using hooks and loops. In the example shown, loops 1002 are coupled to housing 1000 and hooks 1004 are coupled to display 1006. In some embodiments, an easily detachable adhesive (e.g., 3M Command™ strips) adheres loops 1002 to housing 1000 and hooks 1004 to display 1006. Loops 1002 and hooks 1004 are coupled to attach display 1006 to housing 1000 (and camera 1050, when further connected). The combined weight of camera 1050 and housing 1000 is relatively light, so hooks and loops are sufficient to hold camera 1050 and housing 1000 in place. Although this figure shows housing 1000 attached to the top of display 1006, housing 1000 and camera 1050 may be attached to a side, front, bottom, or back surface of display 1006 if desired.

In some embodiments, a housing for a camera may be (if desired) further coupled to other accessories or add-ons. The following figures show some examples of housing 102 from FIGS. 1 and 2 to which an add-on may be further coupled.

Figure 11:
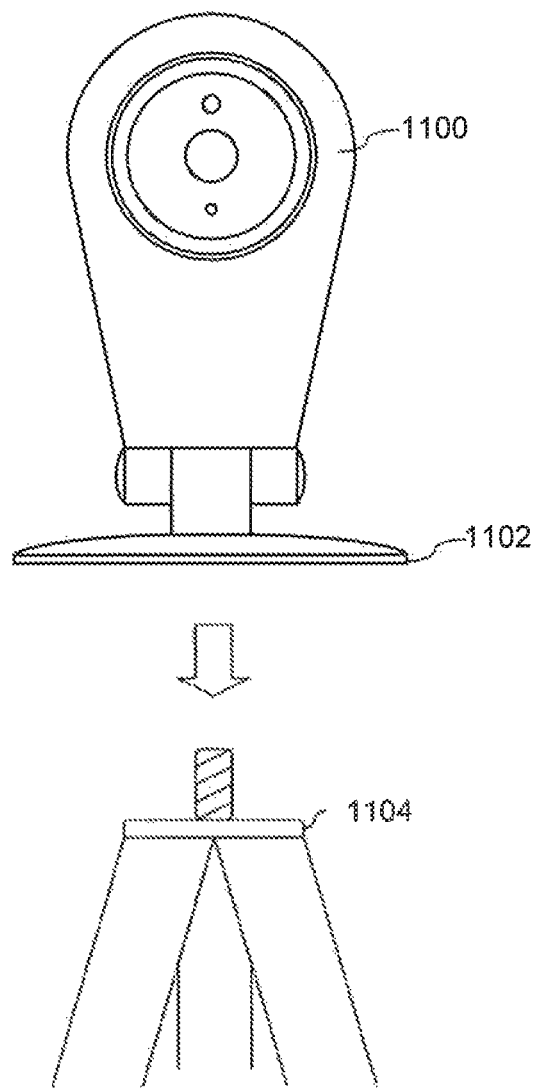
FIG. 11 is a diagram showing an embodiment of a housing and a tripod prior to being coupled together.

FIG. 11 is a diagram showing an embodiment of a housing and a tripod prior to being coupled together. In the example shown, camera 1100 is coupled to housing 1102; housing 1102 is similar to housing 102 shown in FIGS. 1 and 2. The bottom of housing 1102 is screwed into tripod 1104 when desired. In some embodiments, some other connector is used to couple housing 1102 and tripod 1104. Tripod 1104 may provide a more stable base than housing 1102 alone and/or permit usage of camera 1100 on an uneven surface.

Figure 12:
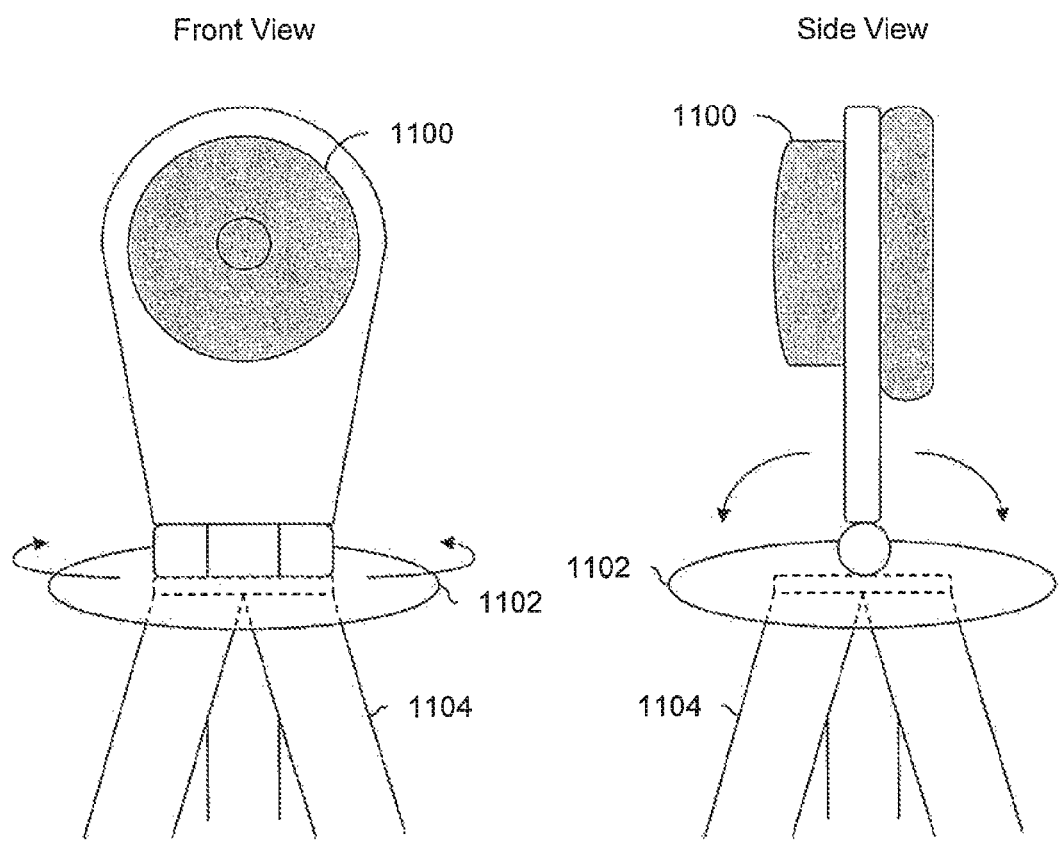
FIG. 12 is a diagram showing an embodiment of a housing and a tripod after being coupled together.

FIG. 12 is a diagram showing an embodiment of a housing and a tripod after being coupled together. As shown in the front view, housing 1102 may be pivoted on tripod 1104 so that camera 1100 can be directed (e.g., to the left or right) to point in a desired direction. As shown in the side view, housing 1102 may be angled forwards or backwards, also to direct camera 1100 in a desired direction.

In some embodiments, it may be desirable to house a camera in a discreet or hidden housing. For example, a person may wish to monitor their cubicle or office to ensure that someone is not going through their possessions at night. Alternatively, a parent of a toddler (who is able to get out of bed by themselves) may wish to hide a camera so the child is not attracted to the camera and plays with it. In some cases, it may be desirable to have a multipurpose housing which performs some other task (e.g., in addition to housing a camera and/or supplying power to the camera). Multipurpose housings may be attractive because of their ability to reduce clutter and/or if there is a limited amount of space. The following figure shows one embodiment of a housing which may be used in such scenarios.

Figure 13:
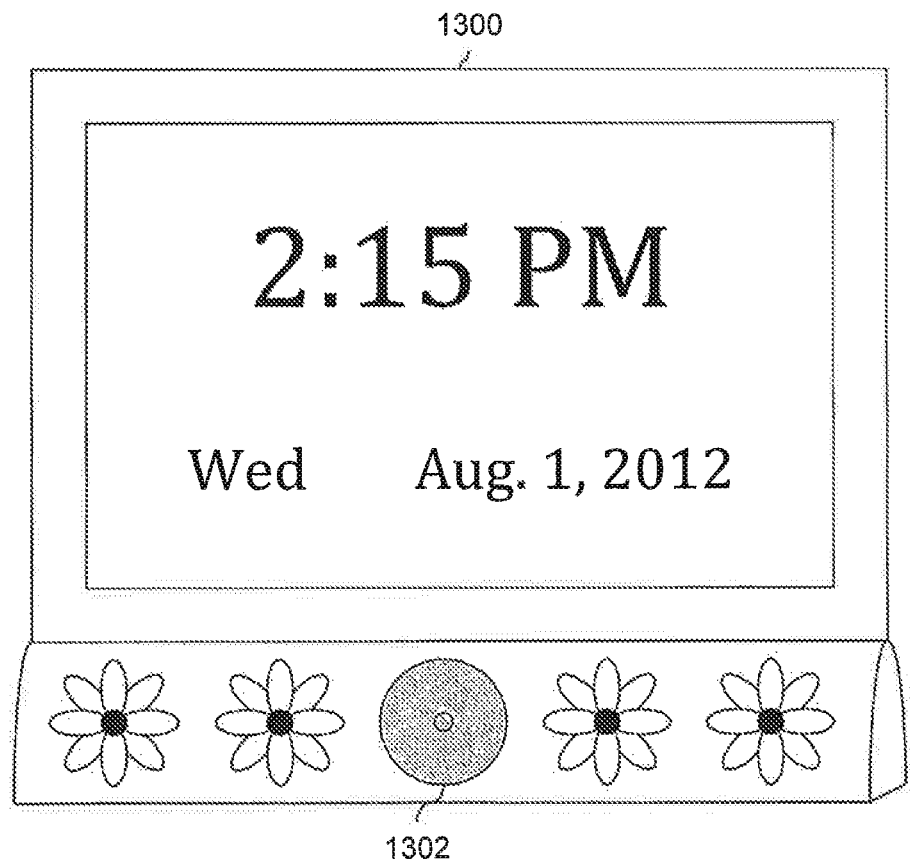
FIG. 13 is a diagram showing an embodiment of a housing associated with a clock.

FIG. 13 is a diagram showing an embodiment of a housing associated with a clock. In the example shown, housing 1300 includes a clock which displays the time, day of the week, and date. It is not necessary for camera 1302 to be coupled to or inserted in housing 1300 in order for the time and date features of housing 1300 to operate properly. For brevity and clarity, components (e.g., electronic components) of housing 1300 associated with displaying the exemplary time and date information are not shown in FIG. 13.

In this particular example, the housing of housing 1300 includes an opening or hole via which camera 1302 is exposed. In some embodiments, the material and/or color of the base of housing 1300 matches the material and/or color of camera 1302 so that camera 1302 is not as noticeable. In some embodiments, a housing has no hole or opening through which a camera is exposed (e.g., the base of housing 1300 is smooth and unbroken and camera 1302 resides completely within the base of housing 1300). In some embodiments, the base of housing 1300 is made of a transparent material (e.g., so that if needed, the camera is able to capture video through housing 1302).

Pet owners may wish to use their cameras to capture what their pet does throughout the day. The following figure shows an embodiment of a housing which may be used to record the indoor or outdoor activities of a pet, such as a dog or a cat.

Figure 14:
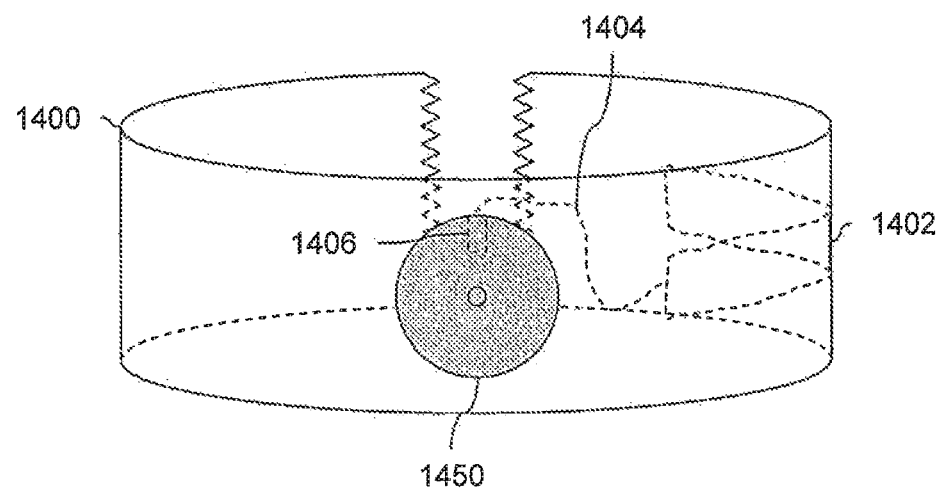
FIG. 14 is a diagram showing an embodiment of a housing associated with a pet collar.

FIG. 14 is a diagram showing an embodiment of a housing associated with a pet collar. In the example shown, housing 1400 is designed to be worn by a pet, such as a dog or a cat. Camera 1450 is coupled to housing 1400 and is exposed via a hole or opening in housing 1400. This permits camera 1450 to record what a pet is looking at or facing towards. For brevity, some details associated with a collar are not shown herein but are not necessarily excluded from the housing. For example, a variety of fasteners (not shown herein) may be used to close a collar, including buckles, hooks and loops, clips, etc.

Housing 1400 includes battery 1402, wire 1404, and USB plug 1406. In some embodiments, the material of housing 1400 is washable and battery 1402, wire 1404, USB plug 1406, and camera 1450 may be removed from housing 1400 so that it can be washed in a washing machine. For example, housing 1400 may have one or more zippers or hook and loop fasteners which, when opened, permit the removal of delicate components before cleaning. In some embodiments, this also permits battery 1402 and/or camera 1450 to be easily removed or inserted (e.g., in order to download video captured by camera 1450 or replace a depleted battery with a charged battery).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A home video capturing and monitoring system, comprising:
    a video camera including:
        a camera configured to capture video data within a field of view;
        a wireless antenna;
        a wireless transceiver coupled to the wireless antenna, the wireless transceiver being configured to wirelessly communicate, via a remote server, the video data captured by the camera to one or more remote devices including a mobile phone;
        a microphone configured to capture audio received at the camera, wherein the captured audio is communicated, concurrently with the wireless communicating via the remote server of the video data captured by the camera to the one or more remote devices;
        a speaker configured to output, concurrently with the wireless communicating via the remote server of the video data captured by the camera to the one or more remote devices, one or more audio messages from a user, the one or more audio messages being captured by a microphone of the mobile phone and received by the wireless transceiver via the remote server;
        one or more infrared light emitting diodes (IR LEDs) configured to illuminate at least a portion of the field of view with infrared light; and
    an application executable by the mobile phone, the application being configured to, when executed by the mobile phone:
        receive from the video camera via the remote server at least a portion of the video data captured by the camera;
        display on the mobile phone the received video data captured by the camera;
        capture, concurrently with displaying the received video data, the one or more audio messages via the microphone of the mobile phone; and
        while displaying the received video data, send the one or more captured audio messages to the video camera via the remote server for playback by the speaker of the video camera, thereby enabling a real-time conversation between a user reviewing the video data from the application to talk from a remote location to a person being filmed by the camera;
    wherein the remote server is located remotely from the video camera and the mobile phone and is configured to:
        receive from the video camera the video data captured by the video camera and streamed to the remote server via the wireless transceiver of the video camera;
        store the received video data;
        relay the received video data to the mobile phone;
        analyze the received video data captured by the video camera;
        cause the user to be notified based on the analysis of the received video data captured by the video camera;
        receive the one or more audio messages from the mobile phone concurrently with receiving from the video camera the video data captured by the video camera; and
        relay the received one or more audio messages to the video camera for output by the video camera concurrently with receiving from the video camera the video data captured by the camera.

2. The home video capturing and monitoring system of claim 1, wherein being configured to analyze the received video data includes being configured to compare a current image with a previous image; and wherein being configured to cause the user to be notified includes sending a notification to the user based on a difference between the current image and the previous image.

3. The home video capturing and monitoring system of claim 1, wherein the wireless transceiver is configured to wirelessly stream the captured video data to the remote server for storage by the remote server, and the application is further configured to, when executed by the mobile phone and at a time later than when the remote server stores the captured video data, receive the captured video data from the remote server and display the captured video data to the user of the mobile phone.

4. The home video capturing and monitoring system of claim 1, wherein the wireless transceiver is configured to wirelessly communicate the captured video data directly to the mobile phone over a wireless network.

5. The home video capturing and monitoring system of claim 1, wherein the video camera further comprises a housing configured to receive the camera, the wireless antenna, and the wireless transceiver.

6. The home video capturing and monitoring system of claim 5, further comprising a wall mount configured to receive the housing.

7. The home video capturing and monitoring system of claim 6, wherein the wall mount is configured to be mechanically coupled to a fixed surface.

8. The home video capturing and monitoring system of claim 6, wherein the housing and the wall mount are configured to allow the housing to be moved relative to the wall mount.

9. The home video capturing and monitoring system of claim 8, wherein the movement includes pivoting the housing relative to the wall mount so as to cause a tilting of the camera.

10. The home video capturing and monitoring system of claim 9, wherein the movement further includes rotating the housing relative to the wall mount so as to cause a panning of the camera.

11. The home video capturing and monitoring system of claim 5, wherein the housing includes a battery configured to power the video camera.

12. The home video capturing and monitoring system of claim 11, wherein the housing is configured to receive AC power to charge the battery and/or power the video camera.

13. The home video capturing and monitoring system of claim 12, wherein the battery is configured to power the video camera in the event AC power no longer supplies power.

14. The home video capturing and monitoring system of claim 5, wherein a portion of the housing matches the shape of a portion of the camera to aid mechanical coupling of the camera to the housing.

15. The home video capturing and monitoring system of claim 5, wherein the housing includes an arm having a cutout opening, and the cutout opening substantially conforms to a contour of the camera and is configured to hold the video camera when the video camera is assembled within the cutout opening.

16. The home video capturing and monitoring system of claim 1, wherein the video camera further includes a universal serial bus receptacle configured to supply power to the camera and/or transmit/receive information.

17. The home video capturing and monitoring system of claim 1, wherein the video camera further includes a front portion and a rear portion, wherein the camera is exposed at a front surface of the front portion of the video camera and the one or more IR LEDs are arranged at the front surface of the front portion of the video camera.

18. The home video capturing and monitoring system of claim 17, wherein the video camera further includes a status light configured provide a status of the video camera.

19. The home video capturing and monitoring system of claim 1, wherein the video camera further includes:
 a video camera module, the wireless antenna, and the wireless transceiver;
 an arm physically coupled to the video camera module;
 a base; and
 a joint that connects the arm and the base and the provides at least one degree of motion of the arm and video camera module mounted therein, the at least one degree of motion including tilting of the camera relative to the base.

20. The home video capturing and monitoring system of claim 19, wherein the video camera module is an integrated video camera module having a shape, and the arm includes a cutout shaped to receive the integrated video camera module.

* * * * *